C. J. BELLAR.
GREASE PUMP.
APPLICATION FILED SEPT. 6, 1920.

1,432,658.

Patented Oct. 17, 1922.
2 SHEETS—SHEET 1.

Inventor
C. J. Bellar.
By Fisher  
Attorneys

Patented Oct. 17, 1922.

1,432,672

UNITED STATES PATENT OFFICE.

GEORGE CONSTANTINESCO, OF WEYBRIDGE, ENGLAND, ASSIGNOR TO WALTER HADDON, OF LONDON, ENGLAND.

ALTERNATING LIQUID CURRENT MOTOR.

Application filed August 25, 1921. Serial No. 495,221.

(GRANTED UNDER THE PROVISIONS OF THE ACT OF MARCH 3, 1921, 41 STAT. L., 1313.)

*To all whom it may concern:*

Be it known that I, GEORGE CONSTANTINESCO, a subject of the King of Great Britain and Ireland, residing at Carmen Sylva, Beechwood Avenue, Oatlands Park, Weybridge, in the county of Surrey, England, have invented certain new and useful Improvements in Alternating Liquid Current Motors (for which I have filed an application in Great Britain Oct. 3, 1916, Patent No. 110,003), of which the following is a specification.

The present invention relates to motors operated by alternating liquid currents of the kind described in the specification of Letters Patent Reissue No. 14738, and has for its object the construction of asynchronous rotary motors actuated by such currents. The term alternating liquid current is defined in specification of Patent No. 1334290.

It will be readily seen that if an eccentric is situated on a shaft, and cylinders and pistons are arranged around the eccentric at angles of 120 degrees apart, and if these pistons are acted on by alternating liquid vibrations also differing in phase by 120 degrees, the effect of the liquid vibrations acting on the pistons is to produce as it were a series of impulses exerted in order about the axis of the shaft acting on the eccentric in a direction parallel with the shaft and exerting a torque if the shaft is made to rotate initially at the synchronous speed.

Such motors have been described in Letters Patent Serial No. 1211679 and Letters Patent Reissue No. 14738. It will be seen, however, that such a motor will not start, and will not exert a torque, unless running at the synchronous speed.

The present invention consists in an asynchronous motor actuated by polyphase alternating liquid currents.

The invention further consists in a rotary motor comprising a stator, transmitter and rotor, the rotor being provided with means allowing it to slip relatively to the rotating impulses, such slip being effected against a resistance.

The invention further consists in a rotary motor comprising a stator, transmitter, rotor, reactance and collector, the collector consisting of a short-circuiting device carried by the rotor itself, while the reactance is also carried by the rotor, and consists in a suitable elastic supporting device.

The invention also consists in a motor comprising a stator having three cylinders placed at 120 degrees apart, with pistons working in such cylinders, and actuated by three phases of an alternating three-phase wave transmission system, the transmitter comprising rings interposed between the stator pistons and the pistons of the rotor, such rotor pistons working in cylinders against the action of springs and a resistance, such as that of liquid pumped through small apertures.

The invention further consists in adjustably restricting the passages through which liquid in the rotor is pumped.

The invention further consists in the improved constructions of asynchronous motor hereinafter described.

It will be seen that very many different forms of motor can be constructed and that many different applications and combinations of the machine are possible, as is the case in asynchronous induction polyphase electric motors. The motor is analogous to the electric motor of this type, and is analogous thereto in its many applications.

Referring to the accompanying diagrammatic drawings:

Figure 3 is a section on the line 3—3, Figure 2;

Figure 4 is an end elevation of the motor shown in Figure 2;

Figure 5 is a section on the line 5—5, Figure 2.

Figure 6 is a section of the outer part of the stator on the line 6—6, Figure 2;

Figure 7 is an axial section of a simple form of asynchronous motor suitable for low powers;

Figure 8 is an axial section of a modified form.

Figure 1:
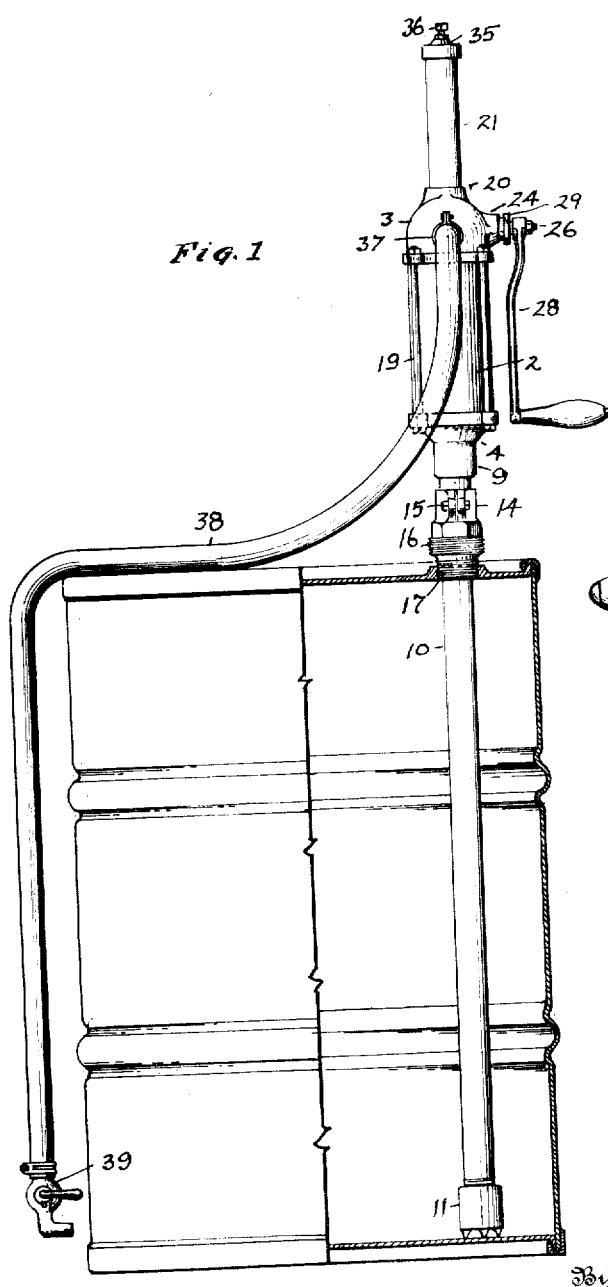
Figure 1 is a section of the motor constructed according to the invention.
Figure 2:
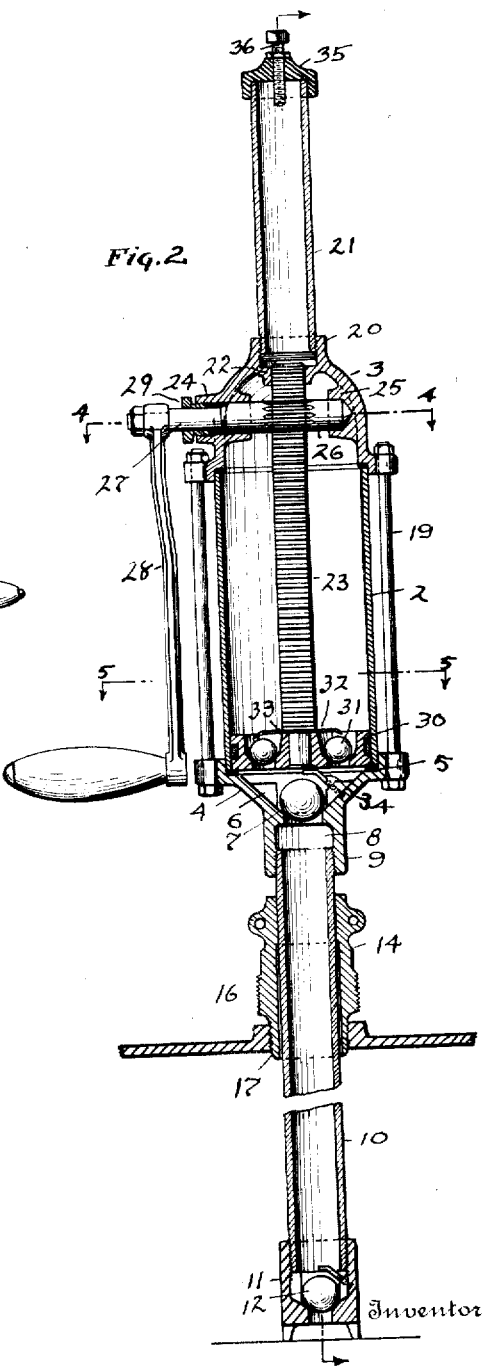
Figure 2 is an axial section of a modified form of three-phase asynchronous motor.

In the form of the invention shown in Figure 1, the stator comprises three cylinders, *a*, *b*, *c*, which are connected to the When starting a motor according to this modification, in order to obtain a large starting torque, the handle 20 must be turned so as to open as far as necessary the passages 17 connecting the rotor cylinders. When the motor has attained a normal speed, the handle will be turned so as to partially close these passages until the slip is reduced to the minimum practicable.

It will be seen that the ball bearings illustrated may be replaced by other anti-friction bearing surfaces, and other devices may be used to avoid friction. Further, it is desirable that good ventilation should be provided in order to dissipate the heat generated in the rotor when working with considerable slip. The lubricating oil may be circulated by a pump to effect cooling of the rotor if desired.

In the form of the invention shown in Figure 7, the cylinders and pistons in the rotor are dispensed with. In this form of the invention, the three phases are connected to the stator 22, actuating three pistons which communicate motion to the oscillating body 23, which is in frictional contact with the rotor 24 over the spherical surface between them, and is acted on by a spring 25, which tends to keep it normal to the axis of the motor. The rotor 24 is suitably keyed to the shaft 26. In this case the reactance is provided by the spring 25. In this case a general ball bearing 27 is also provided, to keep co-axial the parts 23 and 28.

The working of the motor shown in Figure 7 is as follows:—The rotating field produced by the pulsations of the three phase alternating current in the stator 22 causes the deflection of the plane of the front face of the part 28, which is thus inclined to its normal position at right angles to the axis of the motor, the line of maximum inclination in this plane rotating uniformly about the axis. This inclination is effected against the action of the spring 25, which thus produces the necessary reactance on the members 23, 28. The friction between the members 23 and 24 operates in a similar manner to the liquid friction in the modifications above described, with the result that a torque is produced, acting on the member 24, causing the shaft 26 to rotate. The friction between the parts 23 and 24 should be sufficient to prevent unduly large slip.

In the examples given above, only three phase motors have been described. It will be seen, however, that similar constructions can be adopted for any number of phases.

Further, the stator may be worked by an $n$-phase line, and the rotor may be an $m$-phased rotor. The friction device shown in Figure 7 corresponds to an infinite number of phases in the rotor and a limited number of phases in the stator. In order to get a continuous torque, however, three phases at least are necessary. If two phases only were employed, the motor would revolve if initially turned in one direction or the other. The torque, however, would not be constant, but of a pulsating nature. With three or more phases, however, the torque is constant and in one direction. In order to reverse a motor constructed according to this invention, it is only necessary to interchange the phases in the stator by a suitable reversing switch.

In a modified form of motor shown in Figure 8 instead of using a spring as a reactance in order to limit the inclination of the oscillating member, the reactance may be provided by friction between the transmitter 31 and the rotor 32. The limitation of the stroke of the stator pistons 33 is provided for by the flange 34 which bears against the rotor at one point. The necessary friction arises from the pressure of the pistons in the axial direction transmitted through the transmitter to the rotor 32. A thrust bearing may, if desired, be interposed between the pistons 33 and the flange 34 as in the modifications described above.

It will be seen that with motors as above described the maximum torque possible is the torque which is obtained at synchronous speed, that is, when the slip is zero, and it is not possible to obtain the higher torque on starting. The speed of motors according to this invention also cannot exceed synchnonous speed equal to that of the generator producing the wave motion in the transmission line.

It should be understood that the maximum torque on starting asynchronous motors according to the invention is a function of the resistance and capacity of the rotor circuit. If the resistance is diminished below a certain limit, the starting torque diminished instead of increasing. Similarly, in a monophase motor constructed similarly to that above described but with two pistons instead of three, there is a certain critical relation between resistance and reactance at which with a very slight impulse the rotor will immediately be caused to rotate. This property can be made use of in adjusting the resistance in such a machine by means of a suitable plug, as above described, so as to obtain that value of resistance at which the motor will start easily with a very small impulse.

I claim:

1. An asynchronous rotary alternating liquid pressure motor comprising in combination; a stator; a transmitter; means for imparting impulses to said transmitter successively, producing a rotating mechanical field; a rotor; and non-rigid connecting means allowing slip between said rotor and said rotating mechanical field and means opposing resistance to said slip as set forth.

2. An asynchronous rotary alternating liquid pressure motor; comprising a stator, a transmitter, a rotor having pistons, a reactance and a collector, said collector comprising a chamber inside said rotor and passages leading from said chamber to said pistons, while said reactance comprises a non-rigid mechanical connection permitting slip.

In testimony whereof I have signed my name to this specification.

GEORGE CONSTANTINESCO.

Witnesses:
JAS. E. ALLSOP,
W. F. M. ADAMS.

Certificate of Correction.

It is hereby certified that in Letters Patent No. 1,432,658, granted October 17, 1922, upon the application of Charles J. Bellar, of Cleveland, Ohio, for an improvement in "Grease Pumps," an error appears in the printed specification requiring correction as follows: In the heading of the drawings and of the printed specification, date of filing application, for "September 6, 1920" read *August 6, 1920;* and that the said Letters Patents should be read with this correction therein that the same may conform to the record of the case in the Patent Office.

Signed and sealed this 22d day of January, A. D., 1924.

[SEAL.]
KARL FENNING,
*Acting Commissioner of Patents.*